(12) United States Patent
Drobe et al.

(10) Patent No.: US 8,142,017 B2
(45) Date of Patent: Mar. 27, 2012

(54) PRODUCTION OF AN OPHTHALMIC EYEGLASS INTENDED FOR A WEARER

(75) Inventors: Bjorn Drobe, Singapore (SG); Soazic Mousset, Charenton le Pont (FR); Claude Pedrono, Charenton le Pont (FR)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 107 days.

(21) Appl. No.: 12/677,616

(22) PCT Filed: Sep. 11, 2008

(86) PCT No.: PCT/FR2008/051618
§ 371 (c)(1),
(2), (4) Date: Mar. 11, 2010

(87) PCT Pub. No.: WO2009/044080
PCT Pub. Date: Apr. 9, 2009

(65) Prior Publication Data
US 2010/0283964 A1    Nov. 11, 2010

(30) Foreign Application Priority Data
Sep. 12, 2007 (FR) .................................. 07 06388

(51) Int. Cl.
*G02C 7/02* (2006.01)

(52) U.S. Cl. ....................................................... 351/177
(58) Field of Classification Search .................. 351/159, 351/163–177
See application file for complete search history.

(56) References Cited

U.S. PATENT DOCUMENTS

| 6,139,148 | A  | 10/2000 | Menezes |
| 7,008,058 | B2 | 3/2006  | Haimerl et al. |
| 7,021,763 | B2 | 4/2006  | Welk et al. |
| 7,144,110 | B2 | 12/2006 | Haimerl et al. |

(Continued)

FOREIGN PATENT DOCUMENTS

| EP | 0 996 023 | 4/2000 |
| EP | 1 830 223 | 9/2007 |
| FR | 2 863 857 | 6/2005 |
| FR | 2 894 688 | 6/2007 |

(Continued)

OTHER PUBLICATIONS

Jalie, M. "Progressive lenses part 2, the new generation" *Optometry Today, Association of Optometrists*, London, GB. (Jun. 17, 2005) pp. 35-45. ZP 002406290.

*Primary Examiner* — Darryl J Collins
(74) *Attorney, Agent, or Firm* — Occhiuti Rohlicek & Tsao LLP

(57) ABSTRACT

A method for producing an ophthalmic glass (1) intended for an identified wearer of spectacles comprises distribution of an optical power addition between an anterior face ($S_{ANT}$) and a posterior face ($S_{POST}$) of said glass. Said distribution of the addition is done in such a way as to modify an optical characteristic as a function of relative amplitudes of eye and head movements of the wearer. Superior comfort of the glass in use is thus obtained. The optical characteristic which is considered may be, in particular, a variation of magnification procured by the glass between far and near vision conditions. An improvement of the invention is to also modify a design of the progressive glass as a function of the amplitudes of the eye and head movements of the wearer, using only a single semi-finished glass model of fixed design for each addition value of the anterior face.

17 Claims, 12 Drawing Sheets

U.S. PATENT DOCUMENTS

| | | |
|---|---|---|
| 7,806,526 B2 | 10/2010 | Bourdoncle et al. |
| 2003/0206270 A1 | 11/2003 | Katzman et al. |
| 2006/0007392 A1 | 1/2006 | Esser et al. |
| 2007/0103641 A1 | 5/2007 | Bonnin |
| 2007/0182923 A1* | 8/2007 | Kitani et al. .................. 351/169 |
| 2009/0290121 A1 | 11/2009 | Drobe et al. |
| 2010/0198515 A1 | 8/2010 | Becken et al. |

FOREIGN PATENT DOCUMENTS

| | | |
|---|---|---|
| WO | WO 01/62139 | 8/2001 |
| WO | WO 2005/119346 | 12/2005 |
| WO | WO 2006/072683 | 7/2006 |
| WO | WO 2006/116820 | 11/2006 |
| WO | WO 2007/062784 | 6/2007 |

* cited by examiner

FIG. 3

| Prescribed addition A (dioptres) \ Gain G | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.75 | 2.75 | 2.50 | 2.00 | 1.50 | 1.00 | 0.75 | 0.75 | 0.75 | 0.75 | 0.75 | 0.75 |
| 1.00 | 2.75 | 2.50 | 2.00 | 1.50 | 1.00 | 0.75 | 0.75 | 0.75 | 0.75 | 0.75 | 0.75 |
| 1.25 | 2.75 | 2.50 | 2.00 | 1.50 | 1.00 | 0.75 | 0.75 | 0.75 | 0.75 | 0.75 | 0.75 |
| 1.50 | 3.00 | 2.50 | 2.25 | 1.75 | 1.00 | 0.75 | 0.75 | 0.75 | 0.75 | 0.75 | 0.75 |
| 1.75 | 3.00 | 2.50 | 2.25 | 1.75 | 1.00 | 0.75 | 0.75 | 0.75 | 0.75 | 0.75 | 0.75 |
| 2.00 | 3.00 | 2.75 | 2.50 | 2.00 | 1.25 | 1.00 | 0.75 | 0.75 | 0.75 | 0.75 | 0.75 |
| 2.25 | 3.25 | 3.00 | 2.50 | 2.00 | 1.25 | 1.25 | 1.00 | 0.75 | 0.75 | 0.75 | 0.75 |
| 2.50 | 3.25 | 3.25 | 2.75 | 2.00 | 1.50 | 1.25 | 1.25 | 1.00 | 1.00 | 0.75 | 0.75 |
| 2.75 | 3.50 | 3.50 | 3.00 | 2.25 | 1.50 | 1.50 | 1.25 | 1.00 | 1.00 | 1.00 | 0.75 |
| 3.00 | 3.50 | 3.50 | 3.25 | 2.25 | 2.00 | 1.75 | 1.75 | 1.25 | 1.50 | 1.50 | 1.50 |
| 3.25 | 4.00 | 3.50 | 3.50 | 2.50 | 2.50 | 2.25 | 2.25 | 1.75 | 2.00 | 2.00 | 2.00 |
| 3.50 | 4.00 | 4.00 | 3.50 | 3.00 | 3.00 | 2.75 | 2.75 | 2.25 | 2.50 | 2.50 | 2.50 |

EYEGLASS 6 (G = 0) – EYEGLASS PRODUCED RESULTING ASTIGMATISM

EYEGLASS 6 (G = 0) – EYEGLASS PRODUCED OPTICAL POWER

PRODUCTION OF AN OPHTHALMIC EYEGLASS INTENDED FOR A WEARER

CROSS-REFERENCE TO RELATED APPLICATIONS

This application is the National Stage of International Application No. PCT/EP2008/051618, filed on Sep. 11, 2008, which claims the priority of French Application No. 0706388, filed on Sep. 12, 2007, the contents of which are incorporated herein by reference in their entirety.

The present invention concerns the production of an ophthalmic eyeglass for a pair of spectacles intended for an identified wearer.

A so-called "progressive" ophthalmic eyeglass has a variation in optical power when a wearer of this eyeglass successively looks through a far vision zone and a near vision zone of the eyeglass. This variation in optical power, referred to as addition of the eyeglass, results from variations in curvature of at least one of the anterior or posterior faces of the eyeglass. A person skilled in the art then speaks of respective additions of the anterior and posterior faces of the eyeglass, in addition to the addition of the eyeglass considered as being the combination of the two faces.

It is known to vary the respective additions of the anterior and posterior faces of any eyeglass while keeping the addition of the eyeglass substantially constant, the latter remaining equal to or close to the addition value that is prescribed for the wearer. A residual quantity of astigmatism that is present unintentionally in the lateral parts of the eyeglass can thus be reduced, by suitably distributing the variations in curvature between the two faces of the eyeglass.

It is also known to adapt the distribution of a defect in optical power and astigmatism according to a propensity of the wearer to move rather the eyes or the head when he is successively looking in different directions. Amplitudes of the movements of eyes and head of the wearer are then characterised, and then a eyeglass design that procures superior comfort for the wearer is selected according to these amplitudes. The width of the far (or respectively near) vision zone of the eyeglass corresponds to the horizontal interval, for the standard position of use of the eyeglass by the wearer, around the far (or respectively near) vision point, in which the defect in the optical power and/or the astigmatism remains imperceptible, or below a fixed threshold. A design corresponding to far and near vision zones that are broad, but with high power and/or astigmatism gradients, is preferably selected for a wearer who turns his eyes more than his head. Conversely, a design with low gradients, but with narrow vision zones is preferably selected for a wearer who turns his head rather than his eyes. A progressive eyeglass can thus be attributed to each wearer, which procures for him good comfort whatever his behaviour as a mover of eyes or head.

However, it appears that the comfort in use of a progressive eyeglass can be further improved.

One object of the present invention consists therefore in producing a progressive eyeglass that is dedicated to a wearer and affords him increased comfort. In particular, the object of the invention is to reduce the length of the period of habituation that may be felt by the wearer of the eyeglasses.

In particular, the invention may have the object of reducing a sensation of pitching that is sometimes perceived by the wearer when he has been using a progressive eyeglass for a short length of time.

For this purpose, the invention proposes a method of producing an ophthalmic eyeglass for a pair of spectacles intended for an identified wearer, the eyeglass having an anterior face and a posterior face each capable to have an addition, this method comprising the following steps:

/1/ obtaining an optical power addition value for the eyeglass, between a far vision point and a near vision point thereof, which is prescribed for the wearer; and /2/ characterizing relative amplitudes of respective eye and head movements of the wearer, during a change in sight direction of this wearer.

A method according to the invention is characterized in that it also comprises the following steps:

/3/ determining a characteristic that varies according to a distribution of the addition of the eyeglass between the anterior and posterior faces, and is felt differently by the wearer depending on whether he is turning rather his head or his eyes when changing the sight direction;

/4/ depending on the relative amplitudes of the respective eye and head movements of the wearer characterized at step /2/, selecting addition values that are intended respectively for the anterior face and the posterior face of the eyeglass, said addition values of the two faces being adapted so that the eyeglass has substantially the prescribed addition value, and so that the characteristic that is determined at step /3/ is adapted to the wearer; and /5/ manufacturing the eyeglass with the anterior and posterior faces that have the addition value selected at step /4/ for each of the faces thereof.

Thus, according to the invention, the addition values of the anterior and posterior faces of the eyeglass are selected not only so as to obtain substantially the addition value of the eyeglass that is prescribed but also to adapt a characteristic of use of the eyeglass according to the eye and head movements of the wearer. This adaptation of the characteristic of use of the eyeglass corresponds to a customization of the eyeglass. It is carried out in order to improve a sensation of the wearer that occurs when he changes the sight direction. In this way, an increased comfort and use of the eyeglass is obtained.

According to a preferred embodiment of the invention, but not in a limiting manner, the characteristic that is determined at step /3/ may be a variation in a magnification for different sight directions of the wearer through the eyeglass. This variation in magnification is also selected according to the perception that the wearer has of it, in order to procure increased comfort for him.

Variations in magnification that are felt by the wearer may be unpleasant for him, such as a sensation of pitching or even a disturbance of balance. The respective addition values of the anterior and posterior faces of the eyeglass can then be selected at step /4/ so as to reduce these variations in magnification when the relative amplitude of the movements of the head of the wearer that is characterised at step /2/ is greater, compared with variations in the magnification that would be obtained for a lower relative amplitude of head movements, for a prescription in terms of far vision and addition that are identical.

In particular, the variation in magnification may be considered between two sight directions through the eyeglass respectively at the far vision point and at the near vision point. The impression of pitching that is caused by a difference in magnification between the near vision zone and the far vision zone is all the more accentuated when the wearer mainly moves his head rather than his eyes: the difference in magnification can therefore be reduced by using the invention for these wearers. Conversely, in order to provide better visual comfort in close vision for a wearer who moves his eyes more than his head, the magnification of the eyeglass in the near vision area can be increased.

The addition value that is selected for the anterior face of the eyeglass can be smaller when the relative amplitude of the head movements of the wearer is greater, compared with an addition value of the anterior face that would be selected for a lower relative amplitude of the head movements, for near vision and addition value prescriptions for the eyeglass that are identical.

Other particularities and advantages of the invention will appear from the following description of non-limitative example embodiments, with reference to the accompanying drawings, in which:

FIG. 3 is an example of a table indicating addition values of the anterior face of the eyeglass, selected according to the present invention;

FIGS. 5a to 5e correspond respectively to FIGS. 4a to 4e, for another spectacle eyeglass produced according to the invention, and intended for a second wearer who moves his head more than his eyes; and FIGS. 6a, 6b, 7a, 7b, 8a, 8b on the one hand and 9a, 9b on the other hand concern additional eyeglasses produced according to an improvement of the invention.

The invention is now described in detail in the context of the production of correcting ophthalmic eyeglasses of the spectacle eyeglass type. However, it is understood that the invention can be applied to other ophthalmic components that make a correction of a visual defect, such as mountain mask or aquatic diving eyeglasses in particular.

In addition, spectacle eyeglasses that are adapted for making a correction of presbyopia are taken by way of examples. But it is also understood that the invention can be applied in a similar manner to any correcting eyeglass, whatever the nature of the visual defect of the wearer, provided that the faces of the eyeglass can have variable curvatures. In addition, any astigmatism correction can be superimposed in a known manner on the power prescription, which is alone discussed hereinafter.

Figure 1A:
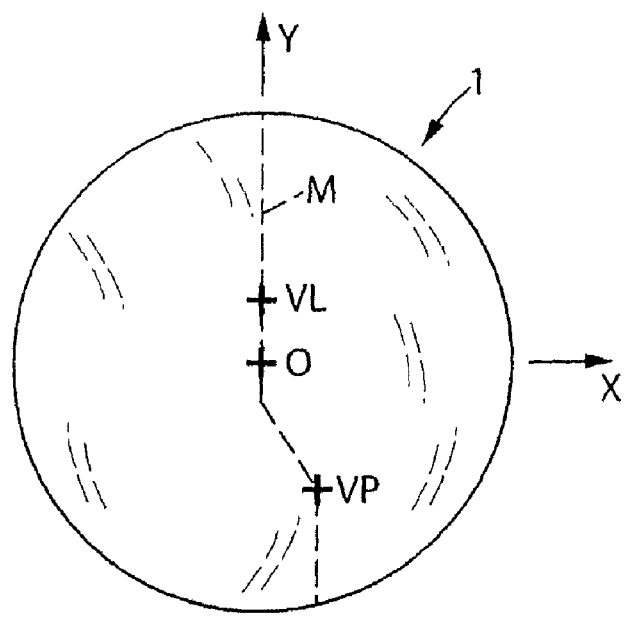
FIGS. 1a and 1b are respectively front and side views of a spectacle eyeglass according to the invention.

Usually, the correction that is prescribed for a future carrier of presbyopia spectacles comprises at least one optical power value that is determined under far vision conditions, and an addition value for the eyeglass. The optical correction power that is necessary for the wearer in near vision is then equal to the value of the optical power prescribed for far vision increased by the prescribed addition value. The eyeglass is then produced so as to have substantially these optical power values at two points that are situated respectively in the far vision zone and the near vision zone. These points are called the far vision point and the near vision point. In FIG. 1a, they are denoted VL and VP respectively. Reference 1 designates the eyeglass and the letter O designates the centre of the eyeglass. This centre O is commonly further used as prismatic reference point for the eyeglass. VL is situated on a vertical line above O, and VP is offset laterally (parallel to the axis X) with respect to VL. The direction of the offset of VP is reversed between a right-side and a left-side eyeglass. A line M, which is referred to as the main meridian line, connects the points VL and VP. It corresponds to the trace on the eyeglass of the sight direction when the wearer is successively observing objects that are situated in front of him at variable heights and distances.

Figure 1B:
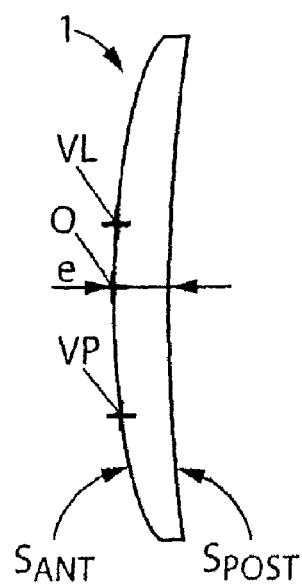

FIG. 1b shows the anterior and posterior faces of the eyeglass. These are respectively convex and concave in shape and denoted $S_{ANT}$ and $S_{POST}$. The eyeglass 1 may be composed of any transparent material compatible with the ophthalmic application. In particular, this material may be mineral, organic or composite.

The points O, VL and VP are defined on the anterior face $S_{ANT}$ of the eyeglass 1, and serve as reference points for evaluating the sphere of this anterior face in order to determine the addition $A_{ANT}$ thereof. The addition $A_{POST}$ of the posterior face $S_{POST}$ of the eyeglass 1 is determined from sphere values that are evaluated at two reference points on this posterior face that correspond to the points VL and VP. These two reference points on the posterior face may be situated respectively facing the points VL and VP, or be offset with respect to these along the path of light rays that pass through the points VL and VP. Alternatively, the reference points on the posterior face may be defined from the points VL and VP using various light path approximations.

Figure 2A:
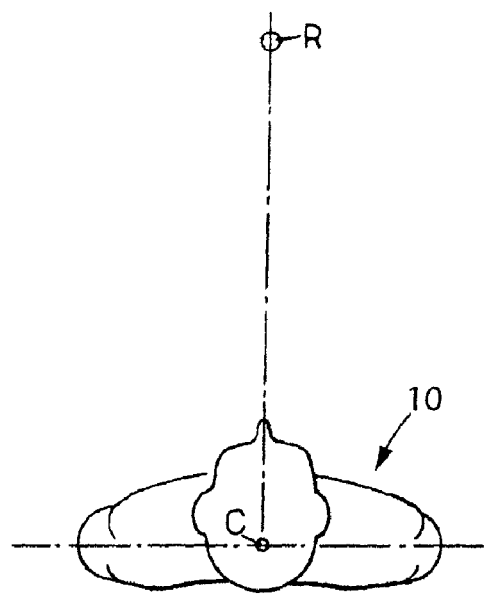
FIGS. 2a and 2b illustrate a principle of measuring eye and head movements for a spectacle wearer.

The relative amplitudes of movements of eyes and head executed by the wearer for which the eyeglass is intended are then characterized. For this purpose, the wearer may be asked to look straight in front of him at a first target, called the reference target, placing himself facing it. The reference target is denoted R in FIG. 2a, and the reference 10 designates the wearer. It may be situated at eye height for the wearer, in particular. The wearer is therefore placed in front of the reference target, with his shoulders substantially situated in a vertical plane perpendicular to the virtual line that connects his head to the reference target. He then has his head and eyes oriented in the direction of the reference target.

From this situation, the wearer is requested to look at a second target, referred to as the test target and denoted T, which is offset with respect to the reference target, without moving his shoulders. To do this, he partly turns his head and partly his eyes (FIG. 2b) so that this sight direction moves from the reference target R to the test target T. Preferably, the test target is offset horizontally with respect to the reference target, so as to characterize the horizontal head and eye movements of the wearer.

Figure 2B:
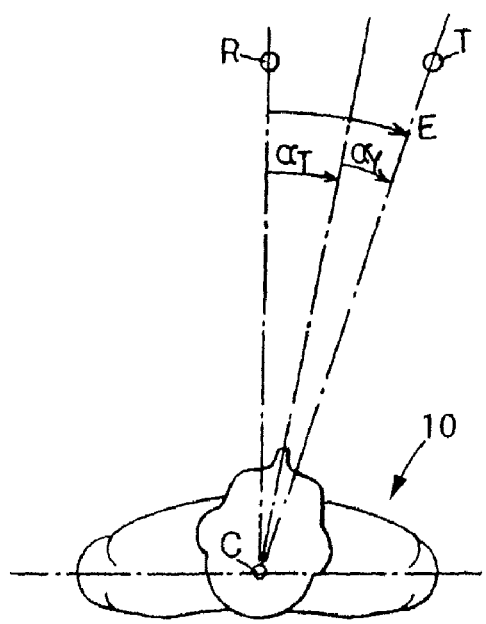

The angular offset of the test target with respect to the reference target is called the eccentricity, and denoted E. The centre C of rotation of the head is taken as the measurement pole for the angles in a horizontal plane that contains this pole and the two targets R and T. In FIG. 2b, $\alpha_T$ designates the rotation angle of the head of the wearer, also called the angular deviation of the head, to move from the first situation of observing the reference target to the second situation of observing the test target. $\alpha_\gamma$ is the angle of the rotation of the eyes that is performed simultaneously by the wearer. The eccentricity E is therefore equal to the sum of the two angles $\alpha_T$ and $\alpha_\gamma$.

The quotient of the angular deviation of the head $\alpha_T$ divided by the eccentricity E is then calculated. This quotient is equal to unity for a wearer who has turned only his head to pass from the reference target to the test target, and to zero for a carrier who has turned only his eyes.

Next a gain G is calculated for this "eye/head" movement coordination test performed for the wearer. The gain G may be defined by a predetermined function of the quotient of the angular deviation of the head $\alpha_T$ divided by the eccentricity E. For example, the gain G may be directly equal to the quotient of $\alpha_T$ divided by E: $G = \alpha_T/E$. A wearer who turns mainly his eyes in order to fix the test target ("eye mover") therefore has a gain value G close to zero, and a wearer who turns mainly his head in order to fix the same target ("head mover") has a value of G close to unity.

This "eye/head" movement coordination test may be performed by the wearer in the shop of a retail optician from whom he orders his pair of spectacles equipped with the correcting eyeglass. Other "eye/head" movement coordination tests that are equivalent to the one that has just been described may be performed alternatively, without the implementation of the invention being modified in its principle.

The invention is described below by adopting the variation of the apparent magnification of the eyeglass as the characteristic of adaptation of the eyeglass to the wearer, via the selection of the addition values of the anterior face and posterior face of the eyeglass. This magnification is produced by the eyeglass when it is fitted in spectacle frames and placed on the face of the wearer for given conditions of use. It is equal to the quotient of the size of the retinal image with correcting eyeglass by the size of the retinal image without eyeglass. This magnification, denoted SM (standing for Spectacle Magnification), may be calculated with a paraxial approximation by applying the following formula:

$$SM = \frac{1}{1-\left(D_1 \cdot \frac{e}{n}\right)} \cdot \frac{1}{1-(d \cdot D)} \quad (1)$$

In this formula, $D_1$ designates the curvature of the anterior face of the eyeglass at the point where the light ray passes through, D is the optical power of the eyeglass at the same point, E designates the thickness of the eyeglass at the centre O thereof (see FIG. 1b), n is the refractive index of the material constituting the eyeglass between its two faces, and d is the distance between the posterior face of the eyeglass and the entrance pupil of the eye. A person skilled in the art will understand that other formulae equivalent to formula 1 may be used as an alternative.

Given that the values of $D_1$ and D vary along the surface of an eyeglass that is progressive, the magnification SM varies accordingly. In particular, it may have two values that are distinct at the far vision point VL and at the near vision point VP. These two values are hereinafter denoted $SM_{VL}$ and $SM_{VP}$. A difference between these two values is liable to cause a disagreeable pitching sensation for the wearer, which is all the greater and inconvenient when the wearer has a tendency to look in different directions by turning his head rather than his eyes, that is to say when the value that is determined for the gain G is greater than 0.5.

It may then be advantageous to select the values of the respective additions of the anterior and posterior faces of the eyeglass according to the value of the gain G. This selection may be executed so as to reduce the difference between the values of the magnification $SM_{VP}$ and $SM_{VL}$, all the more so when the value of G is high, close to 1.

The addition of the anterior face $S_{ANT}$ of the eyeglass is given by:

$$A_{ANT} = \frac{n-1}{2} \cdot \left[\left(\frac{1}{R1_{ANT}} + \frac{1}{R2_{ANT}}\right)_{VP} - \left(\frac{1}{R1_{ANT}} + \frac{1}{R2_{ANT}}\right)_{VL}\right] \quad (2)$$

In this formula, $R1_{ANT}$ and $R2_{ANT}$ designate respectively the minimum and maximum radii of curvature of the anterior face in two directions at right angles to each other. They are determined at the far vision point VL or at the near vision point VP according to the indication that appears as the index of each parenthesis within the square brackets. n designates again the refractive index of the eyeglass material.

In a similar manner, the addition of the posterior face $S_{POST}$ of the eyeglass is given by the following formula, adopting a similar meaning of each symbol:

$$A_{POST} = -\frac{n-1}{2} \cdot \left[\left(\frac{1}{R1_{POST}} + \frac{1}{R2_{POST}}\right)_{VP} - \left(\frac{1}{R1_{POST}} + \frac{1}{R2_{POST}}\right)_{VL}\right] \quad (3)$$

In addition, in a known manner, the final addition of the eyeglass results from a combination of the respective additions of the anterior face and posterior face. For this reason, a person skilled in the art speaks of distributing the addition A of the eyeglass between the two faces of the eyeglass. By way of illustration, the following table contains characteristics of five progressive eyeglasses, which all correspond to the same prescription: sphere and cylinder null for far vision, and prescribed addition of two dioptres. For each of the eyeglasses that are designated hereinafter by corresponding numbers, the table also indicates the values of the magnification SM at the far and near vision points.

TABLE 1

| No. | $A_{ANT}$ | $A_{POST}$ | $SM_{VL}$ | $SM_{VP}$ | G |
|---|---|---|---|---|---|
| 1 | +3 dioptres | −1 dioptre | 1.005 | 1.045 | Wearer who rather |
| 2 | +2 dioptres | 0 | 1.005 | 1.043 | turns his eyes ($G \approx 0$) |
| 3 | +1 dioptre | 1 dioptre | 1.005 | 1.042 | Intermediate case ($G \approx 0.5$) |
| 4 | 0 | +2 dioptres | 1.005 | 1.041 | Wearer who rather |
| 5 | −1 dioptre | +3 dioptres | 1.005 | 1.040 | turns his head ($G \approx 1$) |

The values of the different parameters that are involved in formula 1 are, for these five eyeglasses: e=1.9 mm, n=1.665; d=15 mm. In the particular implementation of the invention that is described here, the anterior face $S_{ANT}$ is first selected from a series of available anterior faces. This anterior face has the addition value $A_{ANT}$. Then the posterior face $S_{POST}$ is calculated in order to obtain, when it is combined with the selected anterior face, a value of the actual addition of the eyeglass that is close to the value A, and in order to obtain at the same time an optical power value at the far vision point that is close to the prescribed corresponding value. The magnification values $SM_{VL}$ and $SM_{VP}$ are calculated using formula 1 at the far vision VL and near vision VP points, with values of the curvature $D_1$ that are determined for the anterior face selected, and optical power values D that are determined for the combination of the anterior face selected and for the posterior face calculated.

Thus reducing the addition of the anterior face of the eyeglass (increasing number of eyeglasses in the first column in table 1) makes it possible to reduce the difference in the magnification between the near vision and far vision points of the eyeglass. By simultaneously increasing the addition of the posterior face, the addition of the eyeglass is kept substantially constant.

The last column in table 1 indicates the type of wearer for which preferably each of the five eyeglasses is intended, according to the value of the gain G that is obtained at the "eye/head" movement coordination test.

From the value of the gain G that has been determined for an identified wearer, several methods may be used for selecting the addition values $A_{ANT}$ and $A_{POST}$, respectively of the anterior face $S_{ANT}$ and of the posterior face $S_{POST}$ of the eyeglass, while keeping the addition of the eyeglass substantially constant. Among these there can be cited:

use of a mathematical formula that connects a distribution parameter for the addition of the eyeglass between the anterior and posterior faces on the one hand and the calculated gain on the other hand. This formula may correspond in particular to a continuous function that determines the distribution parameter from the gain and, possibly, from the prescribed addition value of the eyeglass. For example: $A_{ANT}/A=(k\cdot G+m)$, where k and m are two constants fixed initially. The eyeglasses 2-4 in table 1 correspond to the following values of the constants k and m: k=−1 and m=1, whereas eyeglasses 1 and 5 correspond to k=−2 and m=1.5; and use of a two-input reference table, which indicates addition values of one of the two faces of the eyeglass for respective pairs of values of the prescribed addition and of the calculated gain forming the two inputs of the table. FIG. 3 is an example of such a table. It indicates the addition value $A_{ANT}$ of the anterior face $S_{ANT}$, expressed in dioptres, according to the prescribed addition A and the value of the gain G.

When the variation in the magnification is to be reduced between different points on the eyeglass for a wearer whose the relative amplitude of head movements is great, for an eyeglass prescribed power value for the far vision and a prescribed addition value that are identical, the addition value $A_{ANT}$ that is selected for the anterior face of the eyeglass may be less than the addition value of the eyeglass A that is prescribed for the wearer. The addition that is selected simultaneously for the posterior face is then positive. The table in FIG. 3 indicates such selection, at least when the relative amplitude of the head movements of the wearer is greater than or equal to the corresponding relative amplitude of the eye movements, that is to say when $G \geq 0.5$, and when the addition A of the eyeglass that is prescribed for the wearer is greater than or equal to 1 dioptre. Conversely, for a wearer who mainly turns his eyes, corresponding to a gain G that is less than or equal to 0.2 in the table in FIG. 3, the addition $A_{ANT}$ of the anterior face may be greater than the prescribed addition. A person skilled in the art then speaks of overaddition of the anterior face of the eyeglass and the addition of the posterior face is then negative, in order to compensate for this overaddition. The eyeglass 1 in table 1 above corresponds to such case of overaddition of the anterior face.

The eyeglass can then be manufactured in a common manner, with the anterior and posterior faces having the selected additions and curvatures at the far vision point that are appropriate with respect to the prescription. In particular, a model of semi-finished eyeglass may be selected, which has a final anterior face corresponding to the addition $A_{ANT}$ and which is compatible with the prescription. The posterior face is then re-machined in order to obtain the addition $A_{POST}$ and the prescription.

Figure 4B:
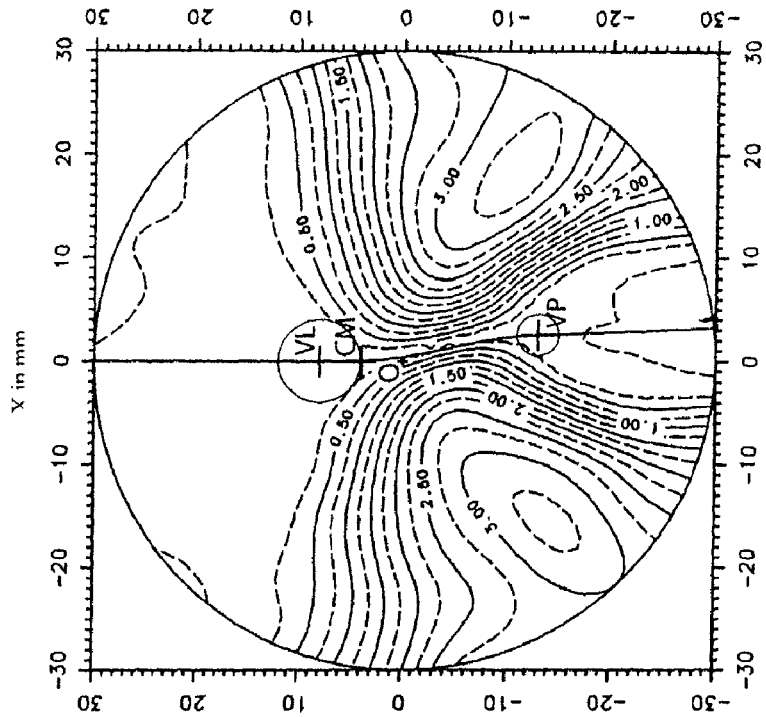
FIGS. 4a and 4b are respectively sphere and cylinder maps of the anterior face of a first spectacle eyeglass produced according to the invention and intended for a first wearer who moves his eyes more than his head.
Figure 4A:
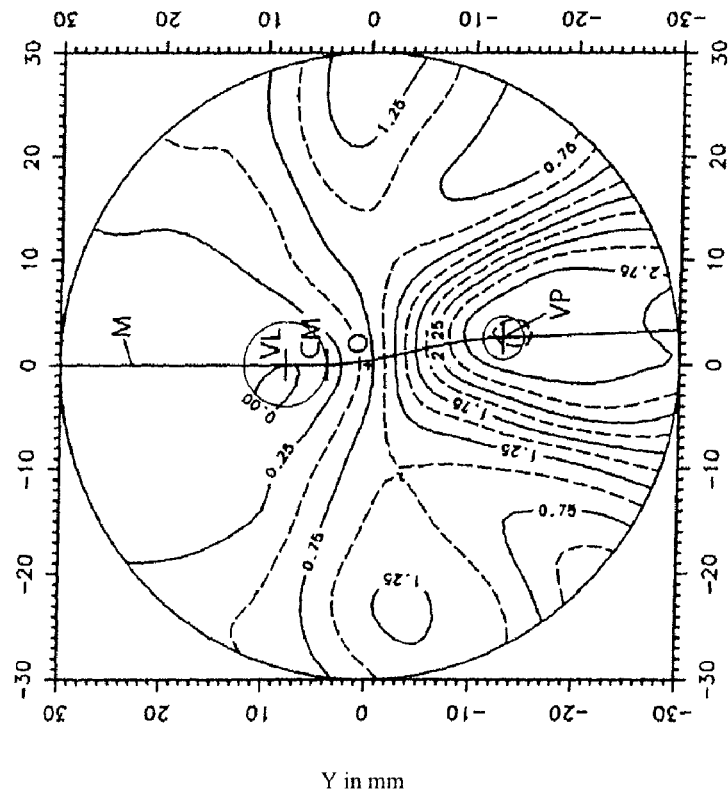

FIGS. 4a and 4b are respective maps of the sphere and cylinder values of the anterior face $S_{ANT}$ of the eyeglass 1 that is indicated in table 1. These figures characterize together the design of this face. They are limited by the circular edge of the eyeglass, and each point on the face is marked by two rectangular coordinates, respectively denoted X and Y, and expressed in millimeters (mm). The lines indicated in FIG. 4a are isosphere lines that connect the points on the face of the eyeglass that corresponds to the same sphere value. This value is indicated in dioptres for some of these lines. In a similar manner, the lines indicated in FIG. 4b are isocylinder lines that connect points on the face of the eyeglass that correspond to the same cylinder value. For reminding, the sphere, which is also called the mean sphere, and the cylinder of the anterior face of the eyeglass at a point thereof are given by the following formulae:

$$Sph_{ANT} = \frac{n-1}{2} \cdot \left( \frac{1}{R1_{ANT}} + \frac{1}{R2_{ANT}} \right) \quad (4a)$$

$$Cyl_{ANT} = (n-1) \cdot \left| \frac{1}{R1_{ANT}} - \frac{1}{R2_{ANT}} \right| \quad (4b)$$

The far and near vision points VL and VP are located on the maps 4a and 4b. The difference in sphere values between points VP and VL corresponds to the addition of the anterior face, which is equal to 3.02 dioptres (FIG. 4a).

An additional point, denoted CM and referred to as the eyeglass fitting cross, is also indicated as a reference on these maps. The point CM is the point on the eyeglass that is to be placed facing the centre of the pupil of the wearer for whom the eyeglass is intended.

Figure 4D:
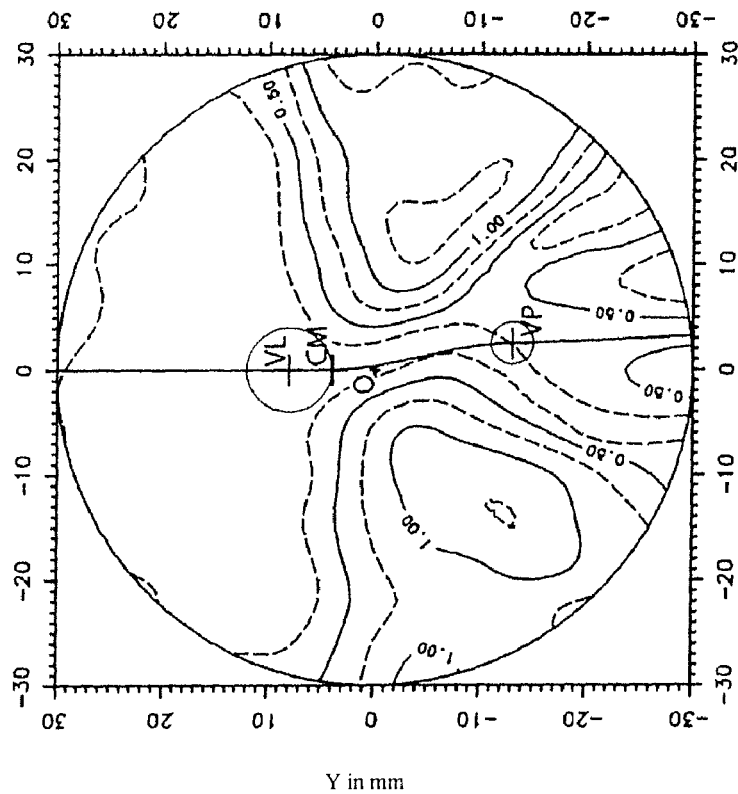
FIGS. 4c and 4d are respectively sphere and cylinder maps of the posterior face of the first eyeglass of FIGS. 4a and 4b.
Figure 4C:
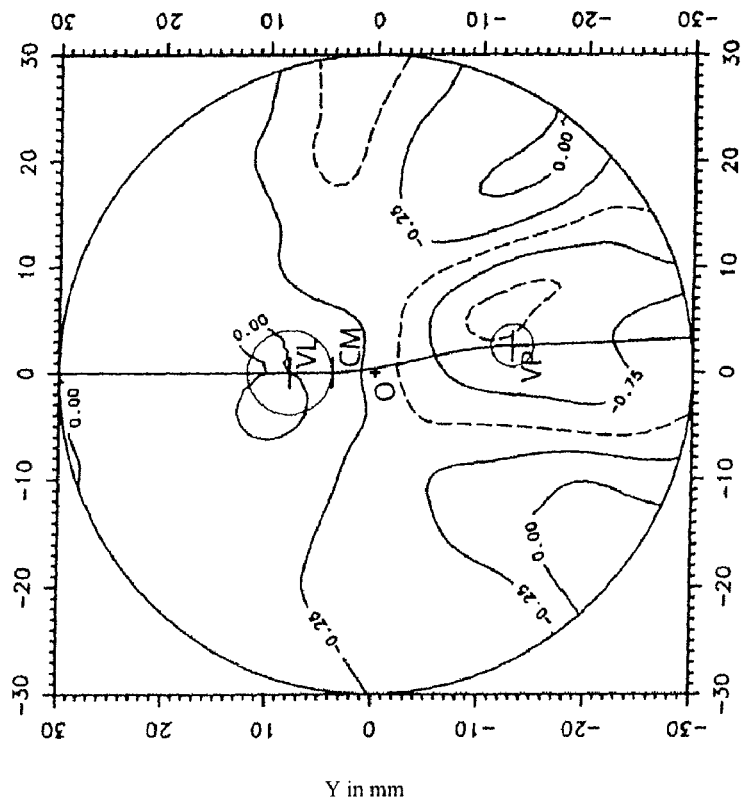
Figure 5E:
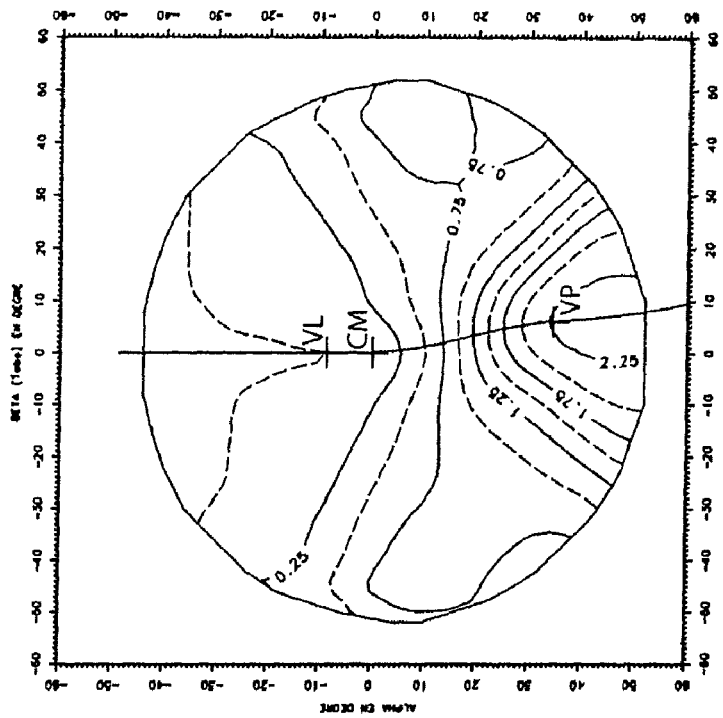

FIGS. 4c and 4d are similar maps for the posterior face $S_{POST}$ of the eyeglass 1, respectively for a sphere and cylinder. The addition of the posterior face of the eyeglass 1 is equal to −0.98 dioptres.

Figure 4E:
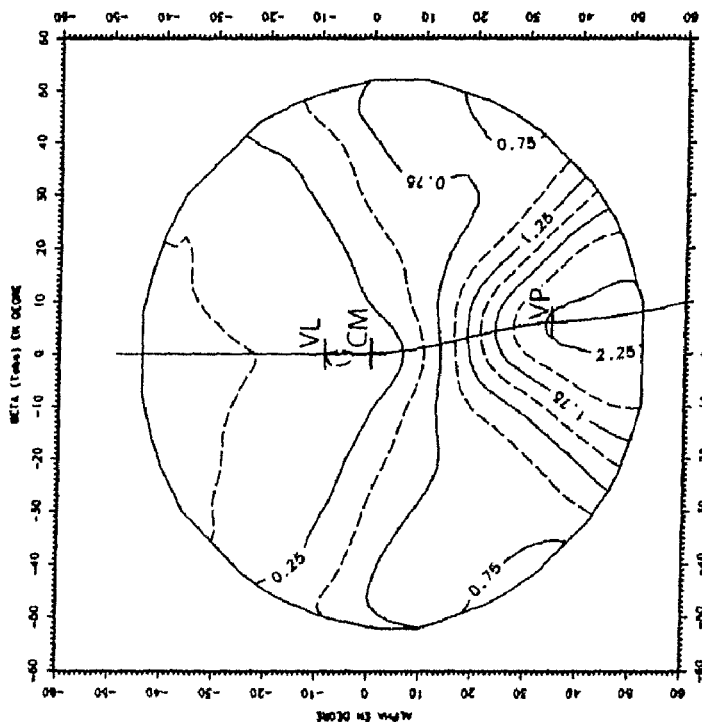
FIG. 4e is a characterisation of optical power of the first eyeglass of FIGS. 4a to 4d.
Figure 5B:
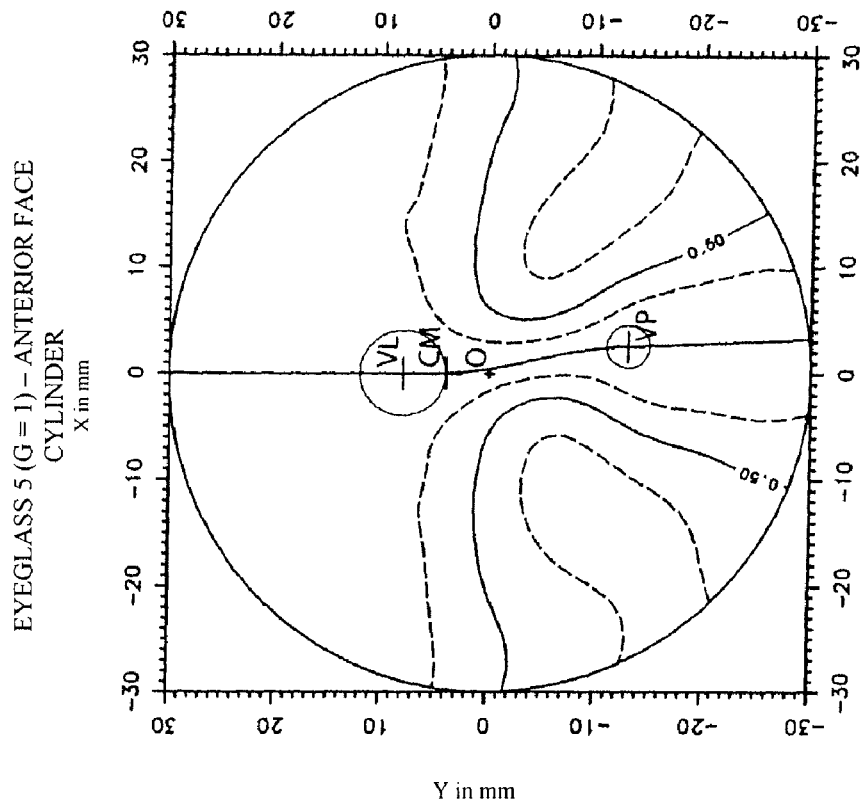
Figure 5A:
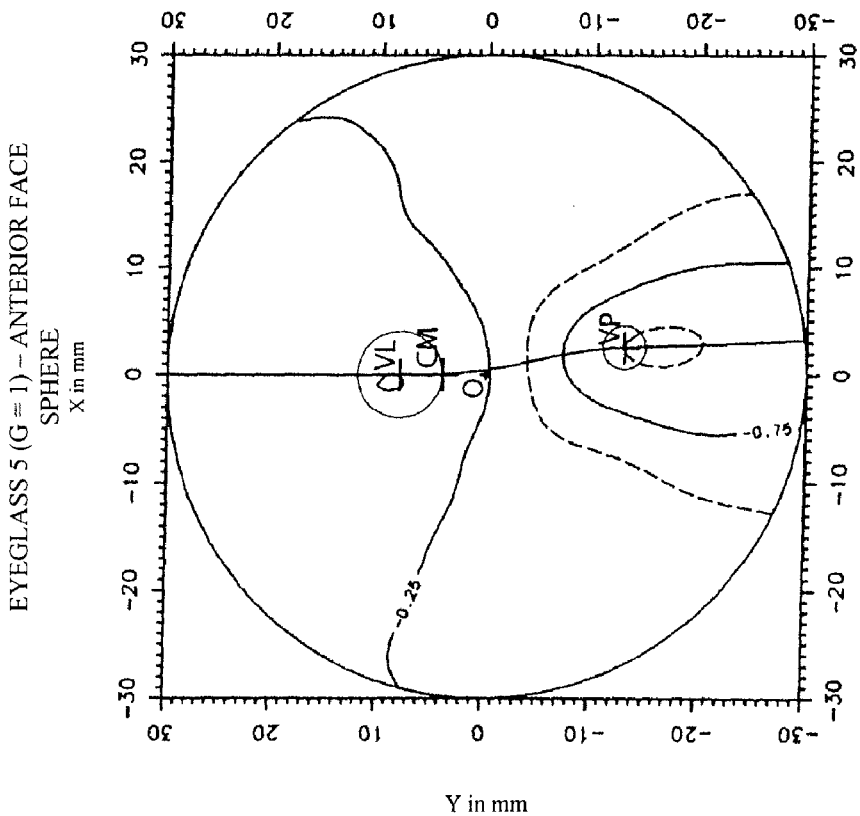
Figure 5D:
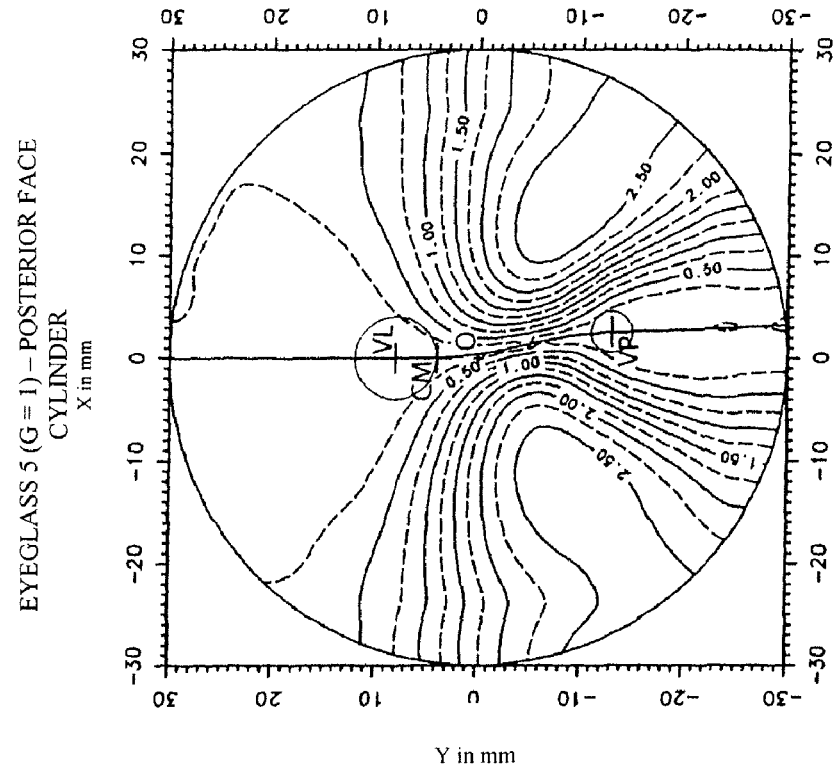
Figure 5C:
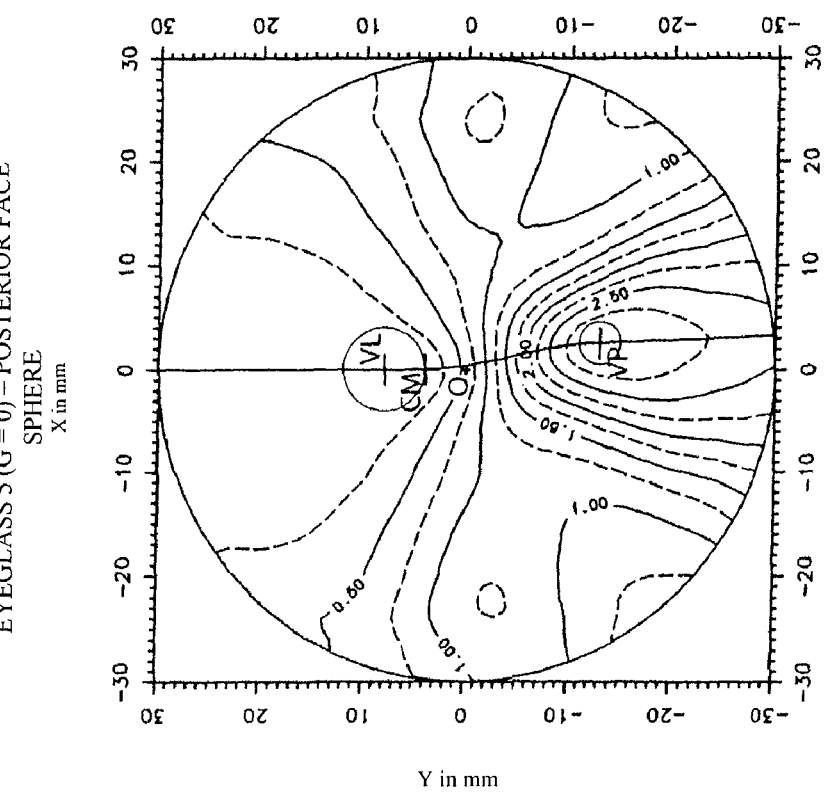

FIG. 4e illustrates the variations in the optical power of the eyeglass 1. Each observation direction through the eyeglass is referenced by two angular coordinates expressed in degrees: alpha marks the observation height with respect to a horizontal plane, and beta marks the rotation of the eye in this horizontal plane. The origin of this system of angular coordinates (alpha=0; beta=0) corresponds to the point CM. The directions that correspond respectively to the points VL and VP are also indicated in this map. The lines indicated in FIG. 4e are isopower lines that connect observation directions through the eyeglass that correspond to the same optical power value. This value is indicated in dioptres for some of these lines. For the example in question, the power of the visual correction is substantially zero at the far vision point VL, and equal to 2.28 dioptres at the near vision point VP. The eyeglass 1 therefore effectively has an addition close to the prescribed value of 2.0 dioptres.

FIGS. 5a to 5e characterize the eyeglass 5 of table 1 in a similar manner. A comparison of FIGS. 4e to 5e show that these eyeglasses have optical functions that are substantially identical, whereas they have magnification values SM at the near vision point VP that are different (see table 1).

An improvement to the invention is now described, according to which the design of the eyeglass is adapted according to the value of the gain G as it has been calculated for the wearer, while using only one semi-finished eyeglass design for each value of the addition of the anterior face.

According to this improvement, the manufacture of the final eyeglass from a semi-finished eyeglass comprises the following prior steps:

selecting a semi-finished eyeglass with an anterior face having the addition value that is selected for this anterior face as described previously, and having a production design; and obtaining two reference anterior faces that correspond respectively to two reference gain values for the "eye/head" movement coordination test and each have the addition value prescribed for the wearer;

calculating an anterior face of a computational target eyeglass by mixing the two reference anterior faces, with mixing proportions that depend on the gain calculated for the wearer with respect to the two reference gain values;

defining a computational target eyeglass by associating the anterior mixing face with a computational posterior face, this latter having uniform sphere and cylinder values selected so that the computational target eyeglass has an optical power at the far vision point that is substantially equal to the value prescribed for the wearer; and by calculation, optimizing a computational test eyeglass which has the anterior face of the semi-finished eyeglass in a fixed manner and has a variable posterior face, so that this computational test eyeglass has optical characteristics substantially equal to the characteristics of the computational target eyeglass.

Preferably, the anterior face of the semi-finished eyeglass initially selected has a mean design, which is intermediate between a design with wide vision zones and a design with narrow vision zones. In this way, it has sphere and cylinder gradients that are moderate.

The posterior face of the semi-finished eyeglass which has been selected initially is then produced, for example by machining, in accordance with the posterior face of the optimized computational test eyeglass. It is understood that, according to the optimization program that is used and the particular case of each eyeglass produced, the optimized computational test eyeglass may have characteristics which are not strictly equal to those of the computational target eyeglass. A person skilled in the art will understand the meaning of the expression "substantially equal optical characteristics" in the sense that the difference between the computational test eyeglass and the computational target eyeglass is reduced by the optimization step.

This improvement makes it possible to adapt to the wearer, according to his propensity to turn rather his head or his eyes, not only the distribution of the addition between the two faces of the eyeglass but also the design of the eyeglass. The adaptation of the design is obtained via the posterior face of the eyeglass solely, which makes it possible to use only one semi-finished eyeglass model for all the eyeglass designs that are finally obtained. Thus the set of semi-finished eyeglasses that is necessary for producing ophthalmic eyeglasses intended for any wearers by using the invention does not need to contain models that are differentiated only by the anterior face design. Management of the stocks of semi-finished eyeglasses is then simplified. In addition, each semi-finished eyeglass model can be manufactured in longer production runs, which reduces its cost price per unit.

In a way that is preferred but not essential to the implementation of the improvement, the reference gain values that are used may correspond respectively to a first wearer who would turn only his eyes when changing the sight direction, and a second wearer who would turn only his head during the same change of sight direction. They correspond therefore to two extreme behaviours of the wearer, so that the anterior face of the computational target eyeglass is then intermediate between the two reference anterior faces.

In a known manner, the mixing of the two reference anterior faces in order to obtain the anterior face of the computational target eyeglass may be performed by characterizing each reference face by its sagittal values ("sag value") at common meshing points defined on these faces. These sagittal values of the two reference faces are then added together, for each meshing point, weighting them by coefficients that are determined in an appropriate manner. Since the gain is equal to the quotient of the deviation of the head of the wearer divided by the eccentricity of the test target, the values of the gain that serve as a reference are zero and unity. The mixing of the reference faces may then be performed by applying the following linear combination to the sagittal heights, for each point of the meshing:

$$S_{ANT}(\text{wearer})=(1-G)\times S_{ANT}(G=0)+G\times S_{ANT}(G=1) \quad (5)$$

where $S_{ANT}$(wearer) designates the anterior face of the computational target eyeglass calculated for the wearer, G is the value of the gain that is calculated for the latter, and $S_{ANT}$ (G=0) and $S_{ANT}$(G=1) designate the reference anterior faces, which each have an addition equal to that which is prescribed for the wearer for which the eyeglass is intended, but which are adapted respectively to virtual wearers who would each turn only his eyes or his head. Thus the two reference anterior faces are each mixed with a linear combination coefficient that is proportional to the difference between the corresponding reference gain value and the gain value calculated for the wearer. It is understood that other surface mixing rules that are equivalent to formula 5 may be used alternatively, in particular according to the gain scale that is adopted for the "eye/head" movement coordination test.

The sum of the two linear combination coefficients that are allocated respectively to the two reference anterior faces, for the same meshing point, is preferably equal to unity. These coefficients may possibly also vary between different points in the meshing, in order to modify a preponderance of one of the two reference faces in the mixture, within certain areas of the anterior face of the eyeglass.

The optimisation of the computational test eyeglass with respect to the computational target eyeglass may possibly be carried out by initially attributing to the computational test eyeglass a posterior face that is corrected by a difference between the anterior face of the semi-finished eyeglass and the anterior face of the computational target eyeglass. This correction is applied with respect to a computational initial posterior face that is spherical or toric, that is to say does not have any addition in itself. Such a correction makes for quicker optimization of the eyeglass that is carried out by calculation. In a manner that is routine for a person skilled in the art, a subtraction of surfaces designates an operation of combining two initial surfaces in order to obtain a third one from them, where a sagittal value of the second surface is subtracted from that of the first surface, at each point on the common meshing, and the third surface is defined by attributing the result of the subtraction as the new sagittal height at the same point. In particular, when the optimization is carried out iteratively using a merit function for measuring a difference between the computational test eyeglass that is obtained at each iteration and the computational target eyeglass, optimization requires a smaller number of iterations in order to achieve the same value of the merit function.

Moreover, the computational target eyeglass may also be defined with a basic value of the anterior face different from that which would be selected for the semi-finished eyeglass according to the vision correction prescribed, in particular according to the optical power value that is prescribed for the wearer and for far vision. In this way, optical aberrations of the final ophthalmic eyeglass can be minimised.

FIGS. 6a, 6b, 7a, 7b and 8a, 8b concern a sixth eyeglass, denoted eyeglass 6, produced according to the improvement that has just been described. This eyeglass 6 corresponds also to a prescribed addition of 2.0 dioptres and a zero optical power at the far vision point. It is intended for a wearer with zero gain, like eyeglass 1 in table 1.

Figure 6B:
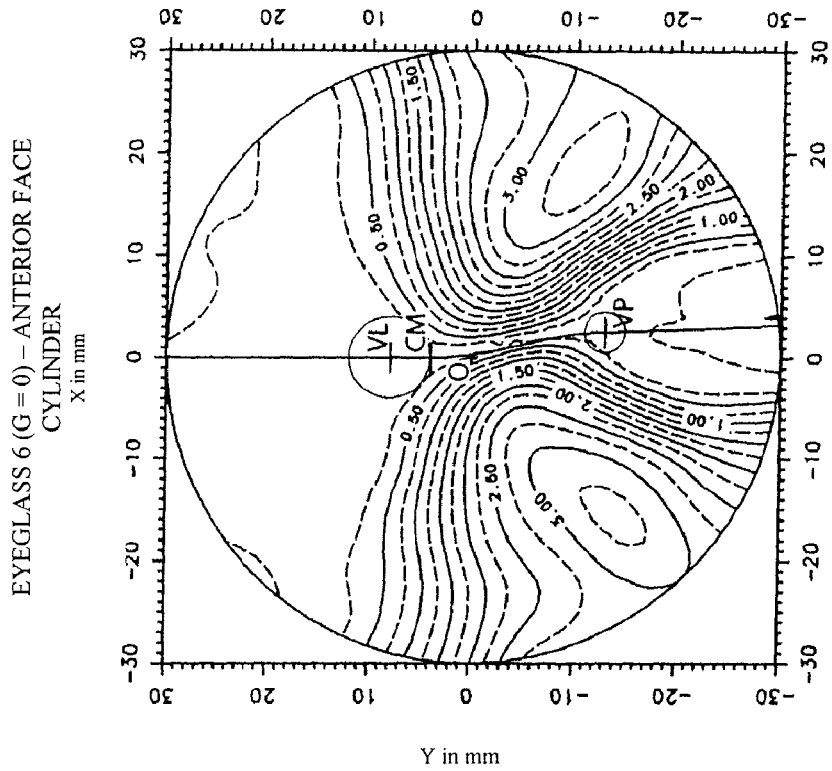
Figure 6A:
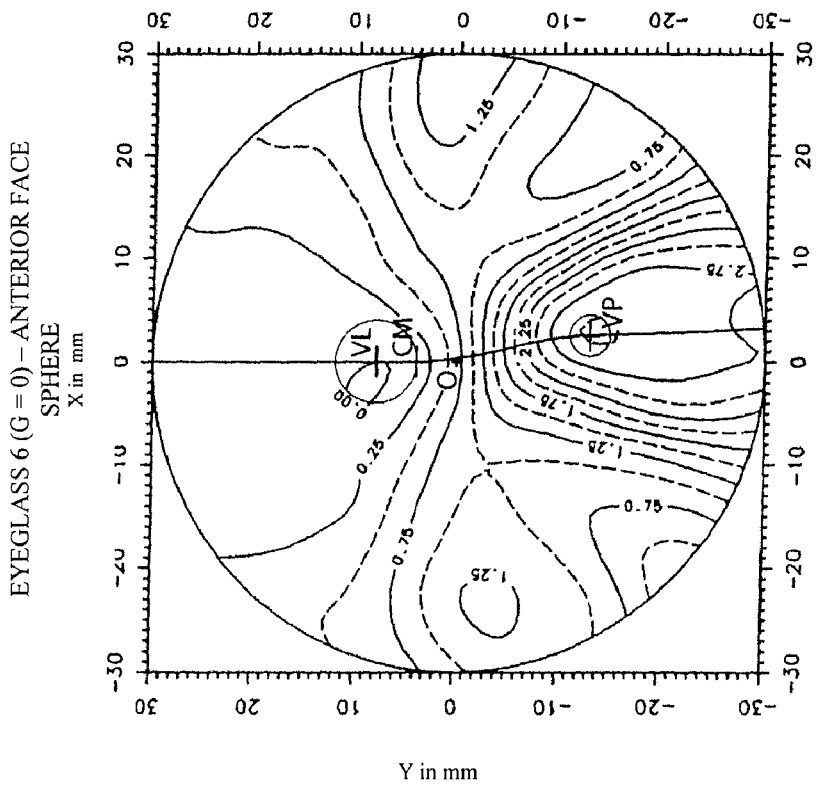

FIGS. 6a and 6b are characterizations of the anterior face of the production semi-finished eyeglass used for producing the eyeglass 6. This semi-finished eyeglass has an anterior face addition that is equal to 3 dioptres, in accordance with the implementation of the invention.

Figure 7B:
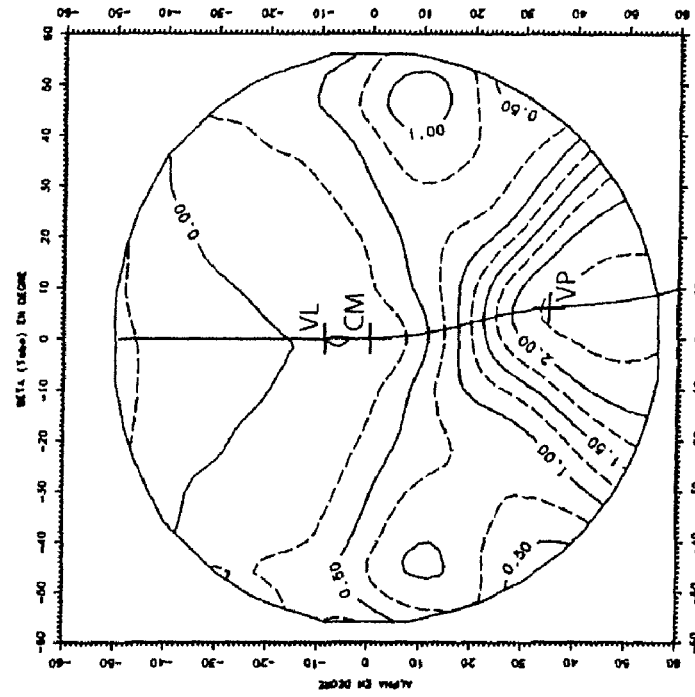
Figure 7A:
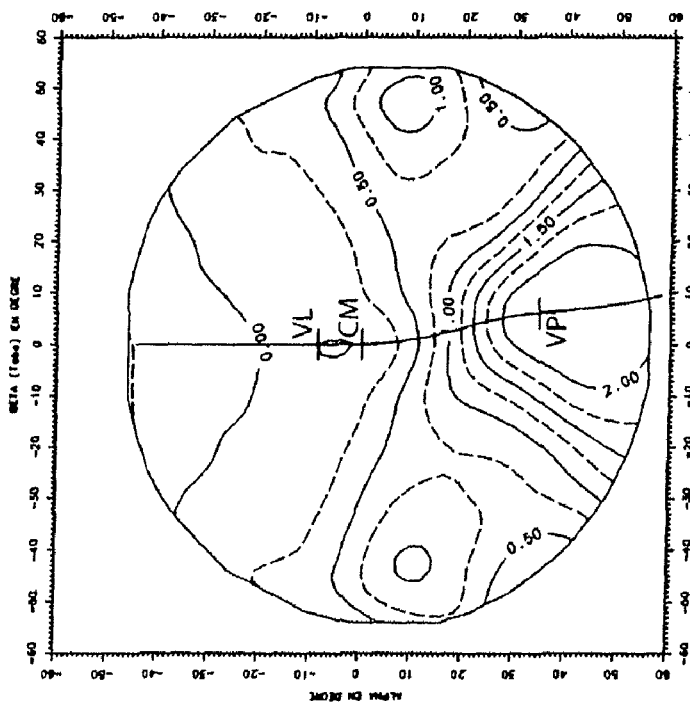

FIGS. 7a and 7b are respective characterizations of optical power of the initial computational test eyeglass and of the computational target eyeglass, as used during the production of the eyeglass 6. The addition of these various computational eyeglasses is substantially equal to 2 dioptres, in accordance with the prescription of the wearer. In the implementation of the improvement made by the inventors, astigmatism values are used for the computational test eyeglass and the computational target eyeglass at the same time as the optical power values, in particular for the optimisation step.

Figure 8B:
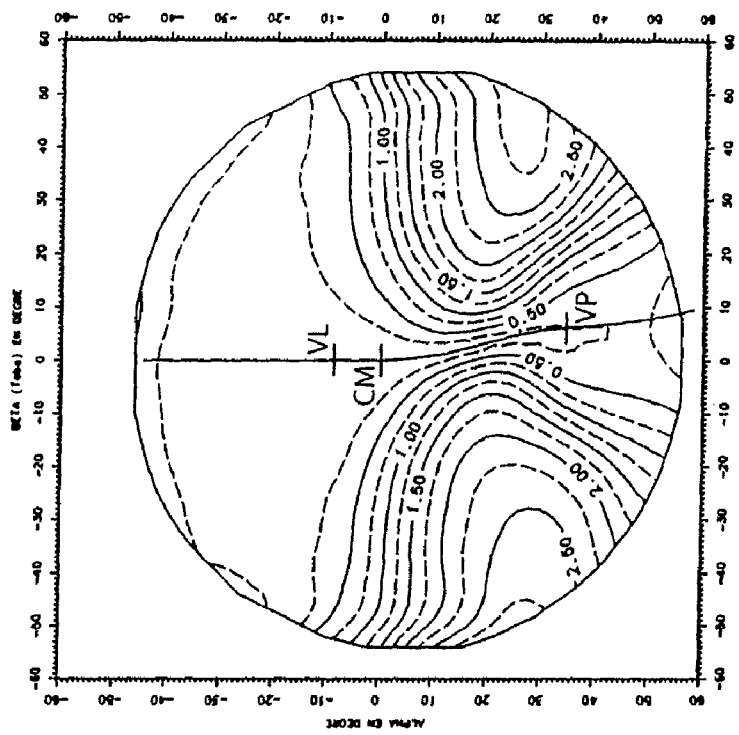
Figure 8A:
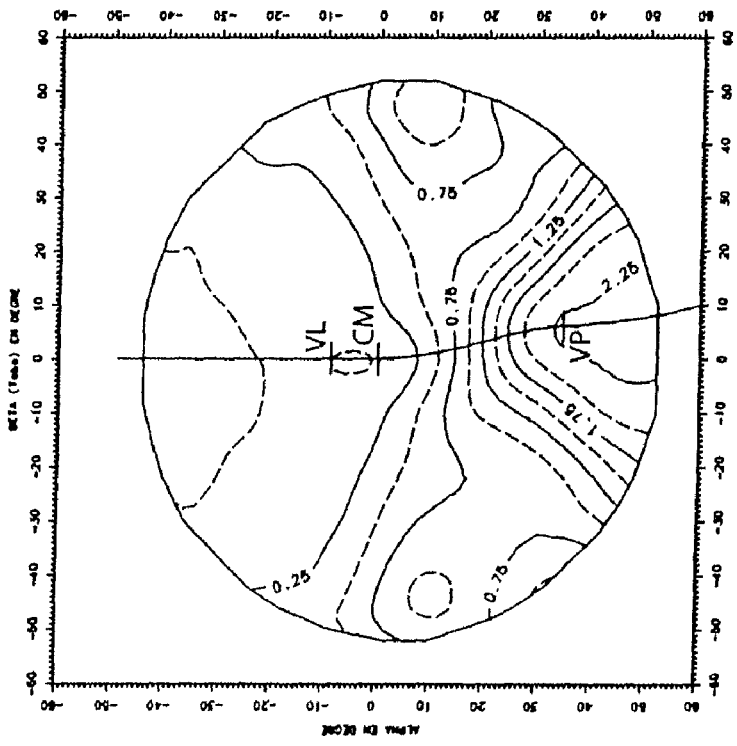

Finally, FIGS. 8a and 8b are characterizations of optical power and resulting astigmatism made for the eyeglass 6 finally obtained.

The lines indicated in FIG. 8b are isoastigmatism lines, which connect observation directions through the eyeglass corresponding to the same astigmatism value. The astigmatism values that are marked on this figure correspond to the actual values from which any astigmatism value prescribed for the wearer have been subtracted. For this reason, the marked values are called resulting astigmatism values, and are almost zero for the observation directions that correspond to points VL and VP.

Figure 9B:
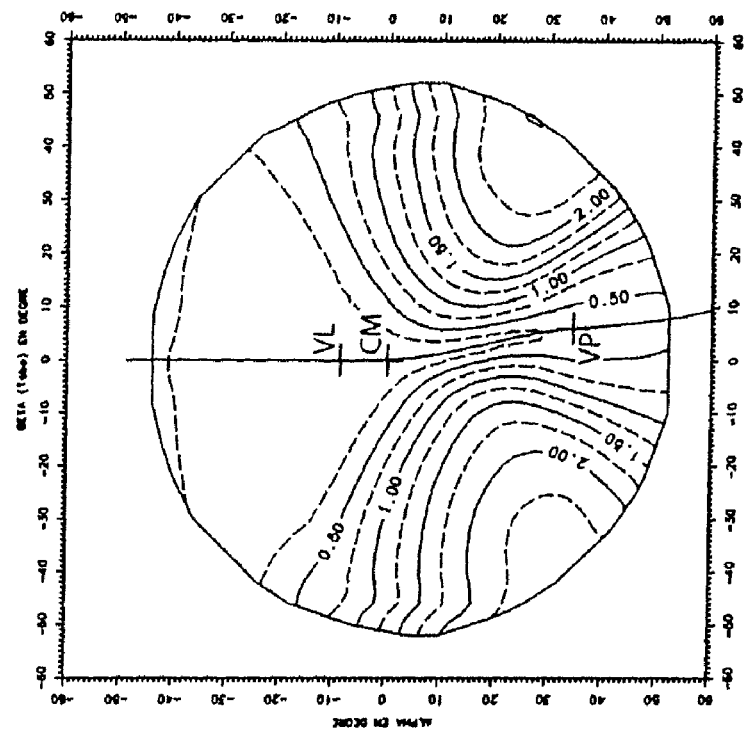
Figure 9A:
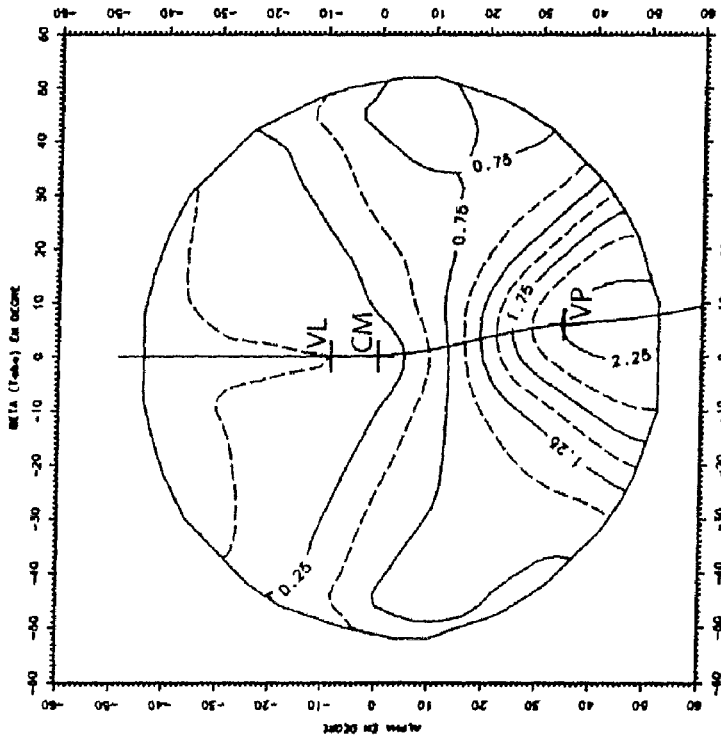

By way of comparison, FIGS. 9a and 9b are characterizations of optical power and residual astigmatism made for a seventh eyeglass, denoted eyeglass 7. Eyeglass 7 was also produced according to the improvement of the invention but being intended for a wearer with gain equal to unity. It therefore corresponds to a prescription that is identical to that of the eyeglass 5 in table 1, with the same respective additions of the anterior and posterior faces. However, the result is an additional optimization of the design, produced for a wearer who turns only his head.

The comparisons in FIGS. 8a and 9a on the one hand and 8b and 9b on the other hand show that the far and near vision fields of the eyeglass 6 are wider than those of the eyeglass 7. In parallel, the optical power and astigmatism gradients of the eyeglass 7 are lower than those of the eyeglass 6, for identical sight directions.

The production, according to the improvement in optimization of the design, of an eighth eyeglass corresponding to the data of eyeglass 3 in table 1, resulted in a design that is intermediate between those of eyeglasses 6 and 7.

It is understood that the improvement of the invention that has just been described for reducing the range of semi-finished eyeglass models is not essential to the implementation of the invention. In addition, a person skilled in the art will understand that the invention may also be implemented according to different though equivalent embodiments. For example, a modulation of a refractive index of the eyeglass can be substituted for the machining of a face by applying known correspondence relationships between the curvature of the face and the refractive index.

The invention claimed is:

1. Method of producing an ophthalmic eyeglass for a pair of spectacles intended for an identified wearer, said eyeglass having an anterior face ($S_{ANT}$) and a posterior face ($S_{POST}$) each capable to have an addition, said method comprising the following steps:
/1/ obtaining an optical power addition value for the eyeglass, between a far vision point (VL) and a near vision point (VP) of said eyeglass, prescribed for the wearer; and
/2/ characterising relative amplitudes of respective eye and head movements of the wearer, performed during a change in sight direction of said wearer;
and being characterized in that it also comprises the following steps:
/3/ determining a characteristic that varies according to a distribution of the addition of the eyeglass between the anterior ($S_{ANT}$) and posterior ($S_{POST}$) faces, and is felt differently by the wearer depending on whether he is turning rather his head or his eyes when changing the sight direction;
/4/ depending to the relative amplitudes of the respective eye and head movements of the wearer characterised at step /2/, selecting addition values that are intended respectively for the anterior face ($S_{ANT}$) and the posterior face ($S_{POST}$) of the eyeglass, said addition values of the two faces being adapted so that the eyeglass has substantially the prescribed addition value, and so that the characteristic that is determined at step /3/ is adapted to the wearer; and
/5/ manufacturing the eyeglass with the anterior ($S_{ANT}$) and posterior ($S_{POST}$) faces that have the addition values selected at step /4/ for each of said faces.

2. Method according to claim 1, wherein the characteristic determined at step /3/ is a variation in a magnification for different sight directions of the wearer through said eyeglass.

3. Method according to claim 2, wherein the addition values that are selected for the anterior face ($S_{ANT}$) and the posterior face ($S_{POST}$) of the eyeglass at step /4/ are adapted to reduce said variation in the magnification when the relative amplitude of the head movements of the wearer characterised at step /2/ is greater, compared with a value of said variation in magnification that would be obtained for a lower relative amplitude of the head movements, for an optical power of the eyeglass at the far vision point and a prescribed addition value that are identical.

4. Method according to claim 3, wherein the addition value that is selected for the anterior face ($S_{ANT}$) of the eyeglass is less than the addition value of the eyeglass prescribed for the wearer, at least when the relative amplitude of the head movements of the wearer that is characterised at step /2/ is greater than or equal to the corresponding relative amplitude of the eye movements and when the addition of the eyeglass prescribed for the wearer is greater than or equal to 1 dioptre.

5. Method according to claim 2, wherein the characteristic determined at step /3/ is a variation in the magnification for sight directions of the wearer through said eyeglass respectively at the far vision point (VL) and at the near vision point (VP).

6. Method according to claim 5, wherein the addition value that is selected for the anterior face ($S_{ANT}$) of the eyeglass at step /4/ is smaller when the relative amplitude of the head movements of the wearer characterised at step /2/ is greater, compared with an addition value of the anterior face that would be selected for a lower relative amplitude of the head movements, for an optical power of the eyeglass at the far vision point and a prescribed addition value that are identical.

7. Method according to claim 1, wherein step /2/ comprises a gain calculation for an "eye/head" movement coordination test performed for the wearer, said gain being dependent on an angular deviation of the head of the wearer ($\alpha_t$) divided by an angular offset (E) of a target looked at by said wearer, and wherein the calculated gain is used at step /4/ to select the addition values intended respectively for the anterior face ($S_{ANT}$) and the posterior face ($S_{POST}$) of the eyeglass.

8. Method according to claim 7, wherein the gain is equal to the angular deviation of the head of the wearer ($\alpha_\tau$) divided by the angular offset (E) of the target looked at by said wearer.

9. Method according to claim 7, wherein step /4/ is executed using a mathematical formula connecting:
   a parameter of distribution of the addition of the eyeglass between the anterior ($S_{ANT}$) and posterior ($S_{POST}$) faces, and
   the gain calculated from the "eye/head" movement coordination test,
so that the gain calculated from the "eye/head" movement coordination test combined with the mathematical formula provides a value for the parameter of distribution of the addition, and said value of the parameter of distribution of the addition permits selection of the addition values which are intended respectively for the anterior face ($S_{ANT}$) and the posterior face ($S_{POST}$).

10. Method according to claim 9, wherein the mathematical formula corresponds to a continuous function determining the parameter of distribution of the addition of the eyeglass between the anterior ($S_{ANT}$) and posterior ($S_{POST}$) faces based on the calculated gain.

11. Method according to claim 7, wherein step /4/ is executed using a two-input reference table, said table indicating the addition values of one of the anterior ($S_{ANT}$) or posterior ($S_{POST}$) faces of the eyeglass for pairs of respective values of the addition of the eyeglass prescribed for the wearer and the calculated gain forming the two inputs of the table.

12. Method according to claim 7, wherein step /5/ itself comprises the following substeps:
   /5-1/ selecting a semi-finished eyeglass with an anterior face ($S_{ANT}$) having the addition value selected at step /4/ for said anterior face, and having a production design; and
   /5-2/ obtaining two reference anterior faces corresponding respectively to two reference gain values for the "eye/head" movement coordination test and each having the addition value prescribed for the wearer;
   /5-3/ calculating an anterior face of a computational target eyeglass by mixing said two reference anterior faces, said mixing proportions depending on the gain calculated for the wearer with respect to the two reference gain values;
   /5-4/ defining a computational target eyeglass by associating the mixing anterior face with a computational posterior face having uniform sphere and cylinder values, said sphere and cylinder values being selected so that said computational target eyeglass has an optical power at the far vision point that is substantially equal to the value prescribed for the wearer; and
   /5-5/ by calculation, optimizing a computational test eyeglass having the anterior face of the semi-finished eyeglass ($S_{ANT}$) selected at substep /5-1/ in a fixed manner, and having a variable posterior face, so that this computational test eyeglass has optical characteristics substantially equal to the characteristics of the computational target eyeglass; and
   /5-6/ producing the posterior face ($S_{POST}$) of the selected semi-finished eyeglass in accordance with the posterior face of the optimized computational test eyeglass.

13. Method according to claim 12, wherein the reference gain values used at substep /5-2/ correspond respectively to a first wearer turning only his eyes when changing the sight direction, and a second wearer turning only his head during the same change in the sight direction.

14. Method according to claim 12, wherein the two reference anterior faces are mixed at substep /5-3/ each with a linear combination coefficient proportional to a difference between the corresponding reference gain value and the gain value calculated for the wearer.

15. Method according to claim 12, wherein the optimization of the substep /5-5/ is performed by initially attributing to the computational test eyeglass a posterior face corrected by a difference between the anterior face of the semi-finished eyeglass ($S_{ANT}$) and the anterior face of the computational target eyeglass.

16. Method according to claim 12, wherein the computational target eyeglass is defined at substep /5-4/ with a base value of the anterior face ($S_{ANT}$) different from a base value selected for the semi-finished eyeglass as a function of an optical power value prescribed for the wearer for the far vision, so as to minimize optical aberrations of the ophthalmic eyeglass produced.

17. Method according to claim 1, wherein the eyeglass is adapted to correct a presbyopia of the wearer.

* * * * *